(12) United States Patent
Thyagarajan et al.

(10) Patent No.: US 12,401,472 B2
(45) Date of Patent: Aug. 26, 2025

(54) CHANNEL STATE INFORMATION REFERENCE SIGNAL PROCESSING FOR NEW RADIO IN THE UNLICENSED SPECTRUM

(71) Applicant: QUALCOMM Incorporated, San Diego, CA (US)

(72) Inventors: Ananta Narayanan Thyagarajan, Bangalore (IN); Xiaoxia Zhang, San Diego, CA (US); Jing Sun, San Diego, CA (US); Stefan Brueck, Neunkirchen am Brand (DE); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/391,946

(22) Filed: Dec. 21, 2023

(65) Prior Publication Data
US 2024/0204940 A1 Jun. 20, 2024

Related U.S. Application Data

(63) Continuation of application No. 16/947,522, filed on Aug. 5, 2020, now Pat. No. 11,888,772.

(30) Foreign Application Priority Data

Aug. 28, 2019 (IN) .............................. 201941034601

(51) Int. Cl.
*H04L 5/00* (2006.01)
*H04W 16/14* (2009.01)
(Continued)

(52) U.S. Cl.
CPC .......... *H04L 5/0048* (2013.01); *H04L 5/0057* (2013.01); *H04W 16/14* (2013.01); *H04W 72/0453* (2013.01); *H04W 72/56* (2023.01)

(58) Field of Classification Search
CPC .... H04L 5/0048; H04L 5/0057; H04W 16/14; H04W 72/0453; H04W 72/56
See application file for complete search history.

(56) References Cited

U.S. PATENT DOCUMENTS

| 6,928,062 B2 | 8/2005 | Krishnan et al. |
| 9,681,325 B2 | 6/2017 | Chen et al. |

(Continued)

FOREIGN PATENT DOCUMENTS

| EP | 3487107 A1 | 5/2019 |
| WO | 2004040827 | 5/2004 |

(Continued)

OTHER PUBLICATIONS

Huawei, et al., "DL Channels and Signals in NR Unlicensed Band", 3GPP TSG RAN WG1 Meeting #96bis, R1-1903926, Xi'an, China, Apr. 8-12, 2019, 11 pages.

(Continued)

*Primary Examiner* — Jason E Mattis
*Assistant Examiner* — Robert Ma
(74) *Attorney, Agent, or Firm* — Harrity & Harrity, LLP

(57) ABSTRACT

Various aspects of the present disclosure generally relate to wireless communication. In some aspects, a user equipment may select one or more sub-bands, of a plurality of sub-bands in a wideband structure of an unlicensed spectrum, for processing in association with receiving a reference signal. The one or more sub-bands may include at least one valid sub-band of a set of valid sub-bands in which the reference signal is received. The user equipment may process the one or more sub-bands in association with receiving the reference signal. Numerous other aspects are provided.

30 Claims, 7 Drawing Sheets

(51) Int. Cl.
*H04W 72/0453* (2023.01)
*H04W 72/56* (2023.01)

(56) References Cited

U.S. PATENT DOCUMENTS

| | | | | |
|---|---|---|---|---|
| 2013/0235837 | A1* | 9/2013 | Suo | H04L 5/0062 |
| | | | | 370/329 |
| 2016/0119951 | A1 | 4/2016 | Mallik et al. | |
| 2017/0195997 | A1 | 7/2017 | Fukuta et al. | |
| 2018/0027571 | A1 | 1/2018 | Shi et al. | |
| 2018/0049219 | A1 | 2/2018 | Gupta et al. | |
| 2018/0102887 | A1 | 4/2018 | Chen et al. | |
| 2019/0089437 | A1* | 3/2019 | Chen | H04B 7/0617 |
| 2019/0357205 | A1* | 11/2019 | Li | H04B 7/0697 |
| 2020/0259608 | A1* | 8/2020 | Kakishima | H04B 7/0626 |
| 2020/0351011 | A1* | 11/2020 | Mukherjee | H04L 5/0048 |
| 2021/0067287 | A1 | 3/2021 | Thyagarajan et al. | |

FOREIGN PATENT DOCUMENTS

| | | |
|---|---|---|
| WO | 2015094611 | 6/2015 |
| WO | 2019032642 A1 | 2/2019 |

OTHER PUBLICATIONS

Ericsson: "DL Signals and Channels for NR-U", 3GPP Draft, 3GPP TSG-RAN WG1 Meeting #97, R1-1907452, DL Signals and Channels for NR-U, 3rd Generation Partnership Project (3GPP), Mobile Competence Centre, 650, Route Des Lucioles, F-06921, Sophia-Antipolis Cedex, France, vol. RAN WG1, No. Reno, Nevada, USA; May 13, 2019-May 17, 2019, May 13, 2019 (May 13, 2019), XP051728883, 8 pages, section 3.3; p. 5-p. 6, the Whole Document.
International Preliminary Report on Patentability—PCT/US2020/070378, The International Bureau of WIPO—Geneva, Switzerland, Mar. 10, 2022.
International Search Report and Written Opinion—PCT/US2020/070378—ISA/EPO—Nov. 9, 2020.
LG Electronics: "Wide-Band Operation for NR-U", 3GPP Draft; 3GPP TSG RAN WG1 #96, R1-1902044, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 25, 2019-Mar. 1, 2019, Feb. 16, 2019 (Feb. 16, 2019), XP051599740, 6 Pages, Section 2.2.
LG Electronics: "Wide-Band Operation for NR-U", 3GPP Draft; 3GPP TSG RAN WG1 #98, R1-1908539, 3rd Generation Partnership Project (3GPP), Mobile Competence Centre; 650. Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765147, 5 Pages, section 3.
Qualcomm Incorporated: "DL Signals and Channels for NR-U", 3GPP Draft; 3GPP TSG RAN WG1 Meeting #98, R1-1909243 7.2.2.1.2 DL Signals and Channels for NR-U, 3rd Generation Partnership Project (3GPP), Mobile Competence Centre; 650, Route Des Lucioles, F-06921 Sophia-Antipolis Cedex; Fran, vol. RAN WG1, No. Prague, CZ; Aug. 26, 2019-Aug. 30, 2019, Aug. 17, 2019 (Aug. 17, 2019), XP051765848, pp. 1-15, the whole document.

* cited by examiner

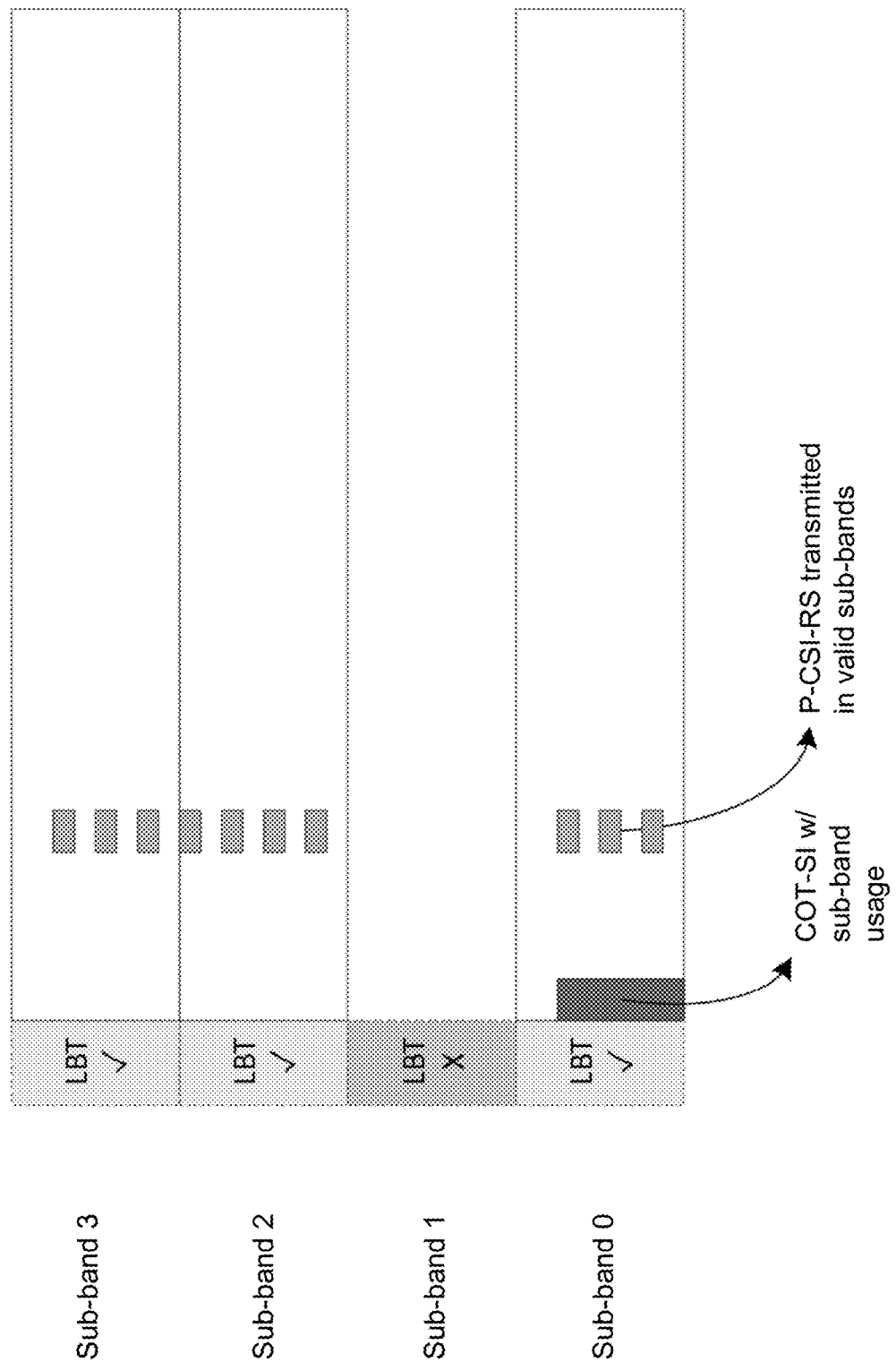

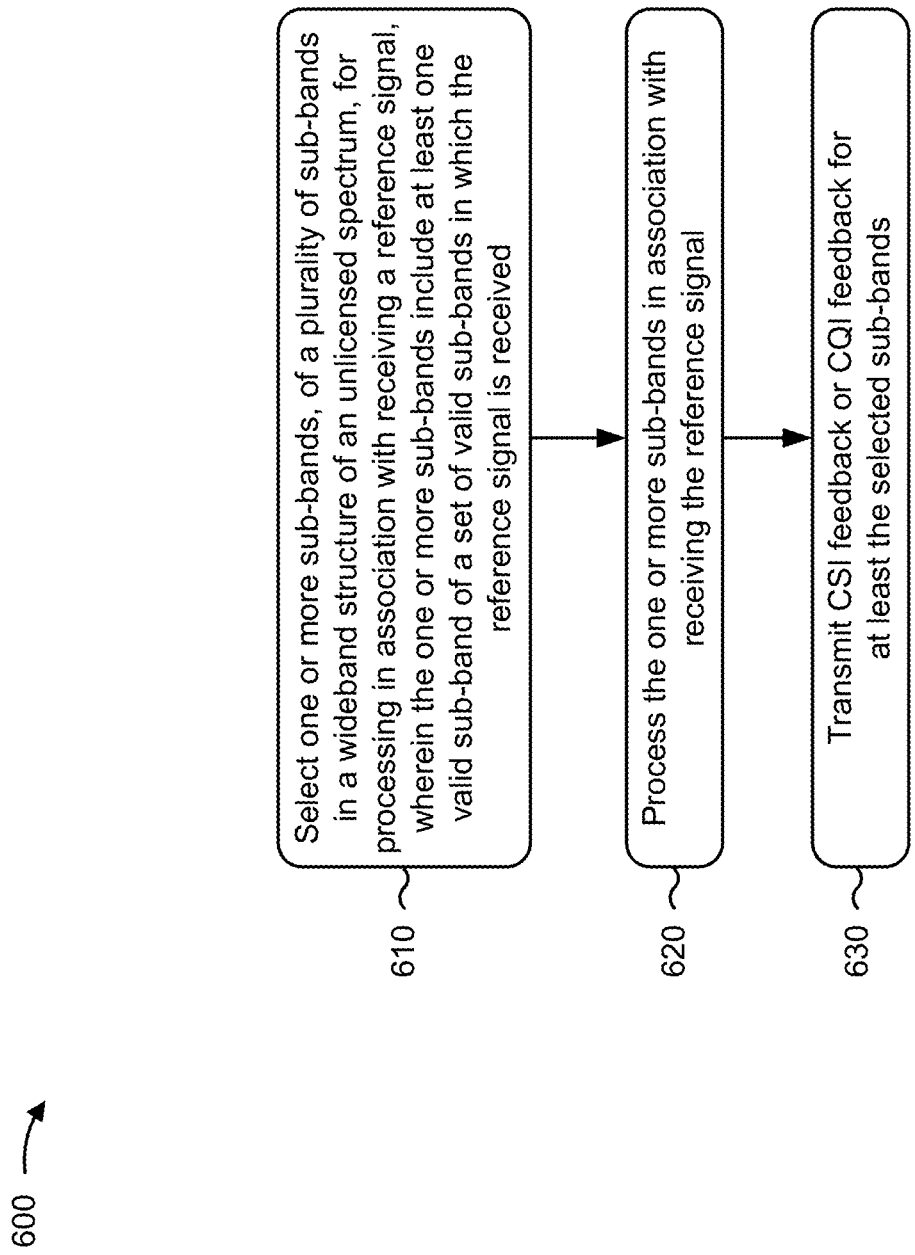

CHANNEL STATE INFORMATION REFERENCE SIGNAL PROCESSING FOR NEW RADIO IN THE UNLICENSED SPECTRUM

CROSS-REFERENCE TO RELATED APPLICATION

This application is a continuation of U.S. patent application Ser. No. 16/947,522, filed Aug. 5, 2020, entitled "CHANNEL STATE INFORMATION REFERENCE SIGNAL PROCESSING FOR NEW RADIO IN THE UNLICENSED SPECTRUM," which claims priority to India Patent Application No. 201941034601, filed on Aug. 28, 2019, entitled "CHANNEL STATE INFORMATION REFERENCE SIGNAL PROCESSING FOR NEW RADIO IN THE UNLICENSED SPECTRUM," the contents of which are incorporated herein by reference in their entireties.

FIELD OF THE DISCLOSURE

Aspects of the present disclosure generally relate to wireless communication and to techniques and apparatuses for channel state information (CSI) reference signal processing for New Radio (NR) in the unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include selecting one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received; and processing the one or more sub-bands in association with receiving the reference signal.

In some aspects, a UE for wireless communication may include memory and one or more processors operatively coupled to the memory. The memory and the one or more processors may be configured to select one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received; and process the one or more sub-bands in association with receiving the reference signal.

In some aspects, a non-transitory computer-readable medium may store one or more instructions for wireless communication. The one or more instructions, when executed by one or more processors of a UE, may cause the one or more processors to: select one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received; and process the one or more sub-bands in association with receiving the reference signal.

In some aspects, an apparatus for wireless communication may include means for selecting one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received; and means for processing the one or more sub-bands in association with receiving the reference signal.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A and 5B are diagrams associated with an example of channel state information (CSI) reference signal processing for New Radio (NR) in the unlicensed spectrum, in accordance with various aspects of the present disclosure.

FIG. 6 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
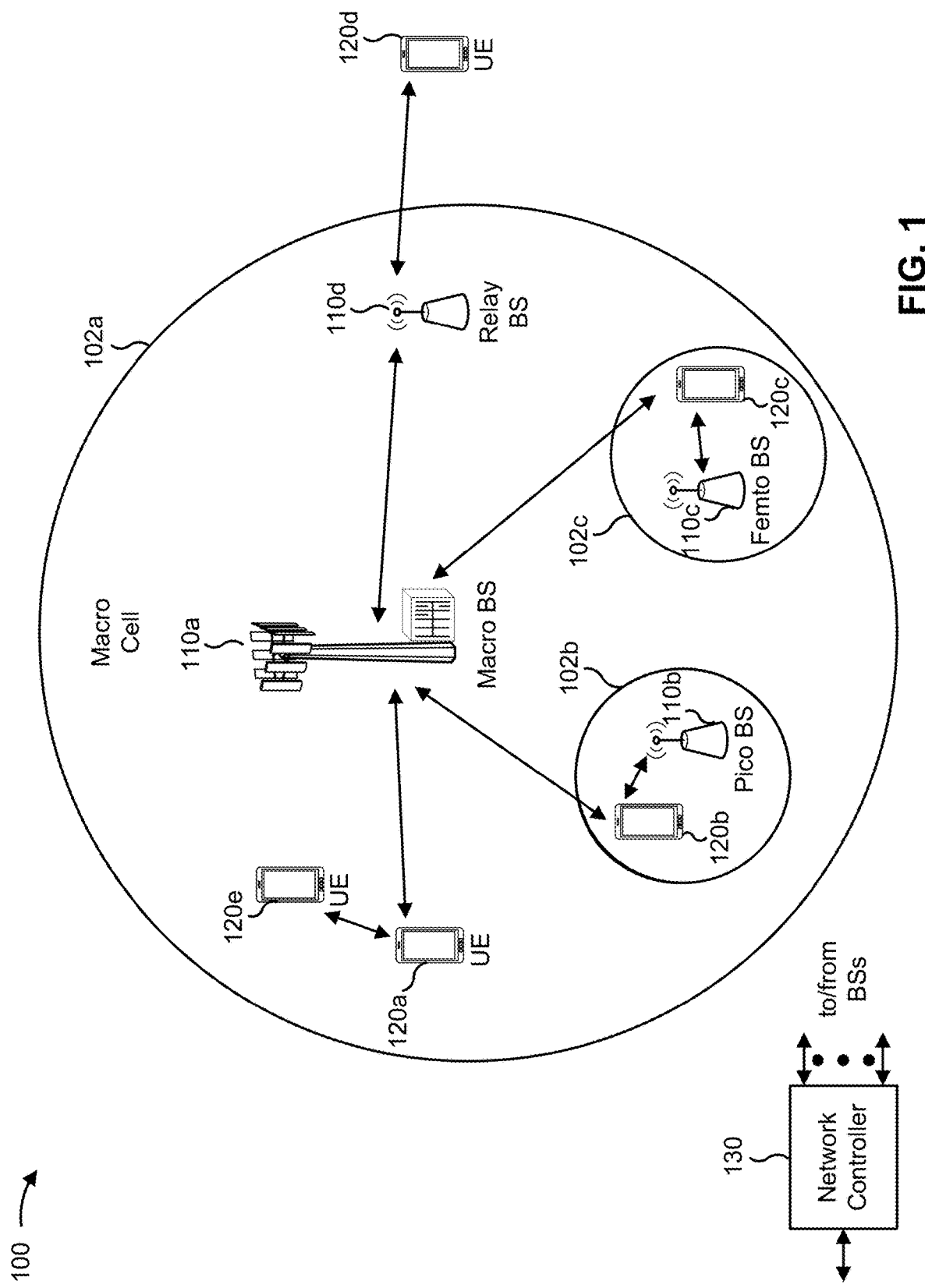
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120c) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
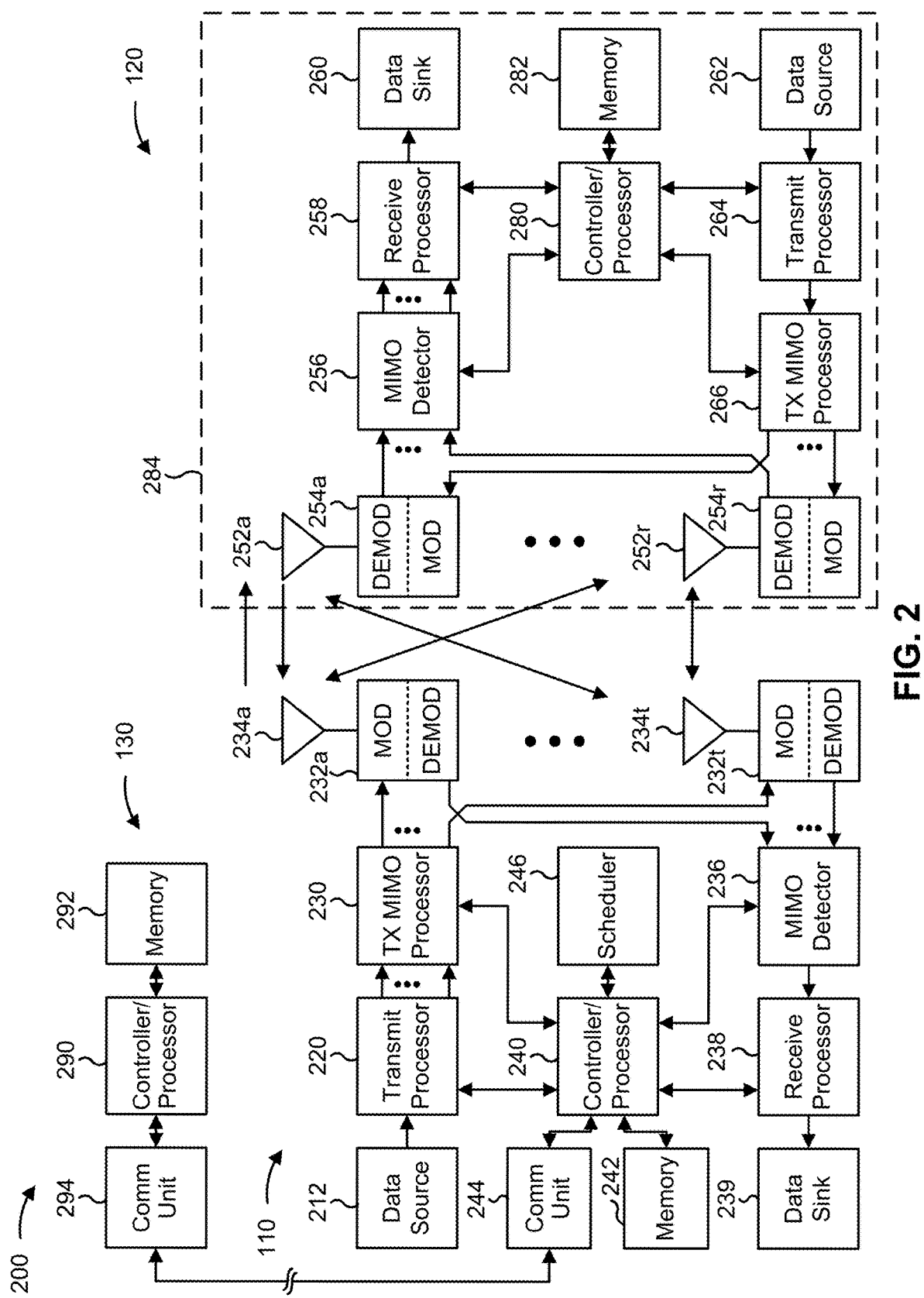
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with channel state information (CSI) reference signal processing options for NR in the unlicensed spectrum, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for selecting one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received; means for processing the one or more sub-bands in association with receiving the reference signal; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
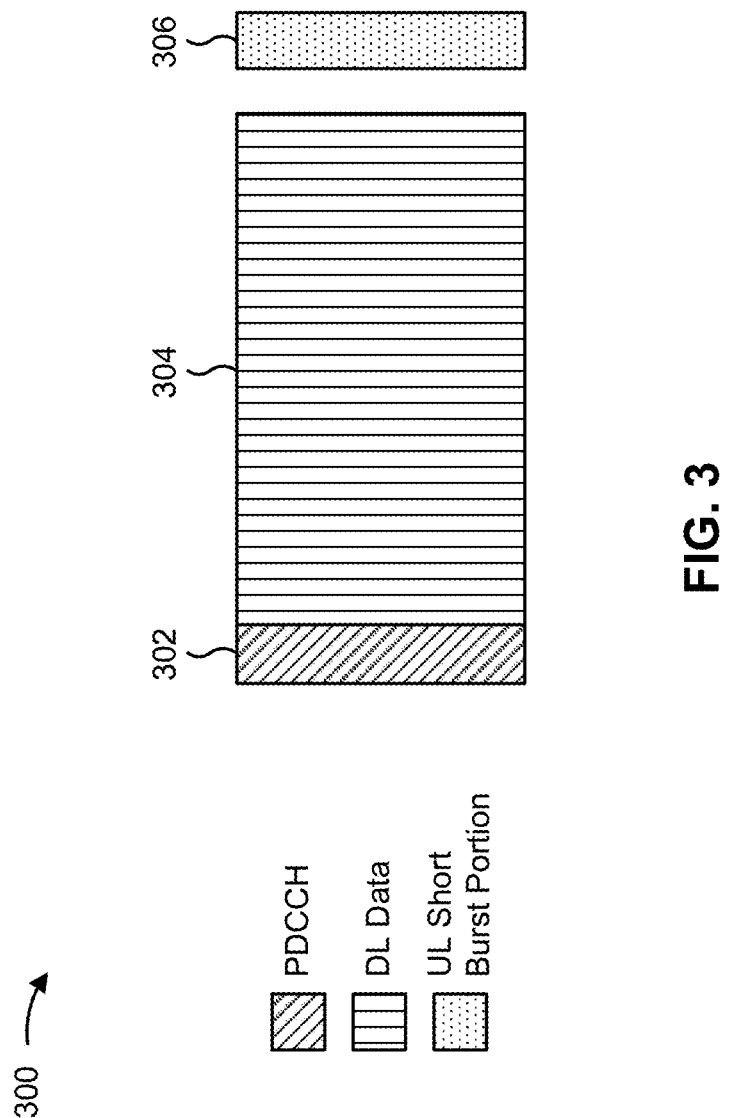
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PDSCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 3 is provided as an example. Other examples may differ from what is described with regard to FIG. 3.

Figure 4:
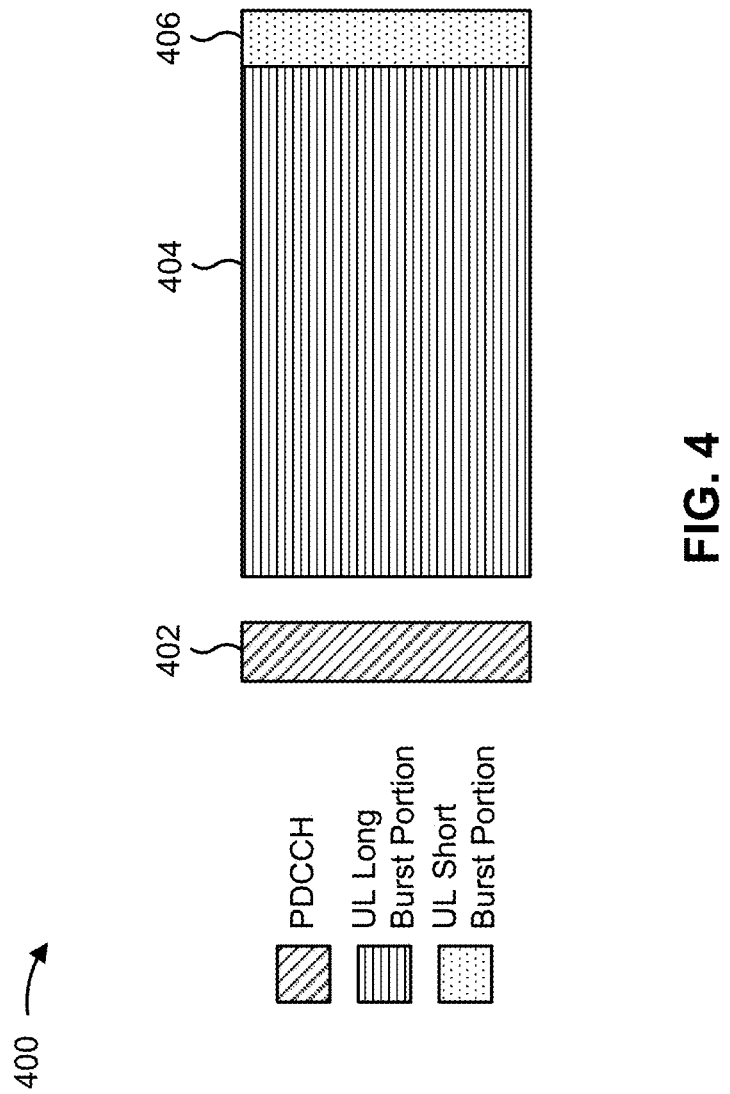
FIG. 4 is a diagram illustrating an example of an uplink (UL)-centric slot, in accordance with various aspects of the present disclosure.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

Some radio access technologies (RATs), such as NR, allow operation in an unlicensed spectrum. The NR RAT for the unlicensed spectrum may be referred to as NR-Unlicensed (NR-U). Some RATs may support different bandwidths for sub-bands or combinations of sub-bands, such as 20 MHz, 40 MHz, 60 MHz, 80 MHZ, and/or the like. For example, multiple sub-bands of 20 MHz may be combined to form a larger bandwidth, referred to as a wideband. The combination of multiple sub-bands may be referred to herein as a wideband structure. A wideband structure may be a bandwidth part of the UE (i.e., a configured bandwidth of the UE within which the UE may communicate on one or more sub-bands).

If a UE is configured with multiple sub-bands on the unlicensed spectrum, not all sub-bands may be available at a given time. For example, some sub-bands may be occupied by other UEs, base stations, wireless nodes, and/or other network devices. A base station or a UE may perform a listen-before-talk (LBT) procedure to determine whether one or more sub-bands are available for a communication. In the LBT procedure, a base station or UE may listen to a channel or a sub-band for a length of time, then may transmit an indication that the base station or UE has reserved the channel or the sub-band for a time window (referred to as a channel occupancy time (COT)) if no other reservation for the channel or the sub-band is received while listening, or if interference on the channel or the sub-band satisfies a threshold (e.g., is below an interference threshold). Thus, coexistence between devices on non-centrally-scheduled channels, such as sidelink channels on the unlicensed spectrum, is enabled.

A base station may use channel state information (CSI) feedback to determine channel conditions for a channel between the base station and a UE. For example, the base station may transmit a CSI-RS to one or more UEs with certain characteristics that may be available to or determinable by the UE. Using the CSI-RS, the UE may determine CSI feedback, such as a CSI report, that indicates the channel conditions between the base station and the UE. However, in the case of unlicensed spectrum with a wideband structure, as indicated above, not all sub-bands configured for the CSI-RS may be available when the CSI-RS is to be transmitted by the base station.

One technique for resolving this issue is to define the CSI-RS to be valid only when all sub-bands of the wideband structure are valid (i.e., present in the COT associated with the CSI-RS transmission). In other words, the CSI-RS may be defined such that the base station will transmit the CSI-RS only if all sub-bands of the wideband structure are available (e.g., as determined based at least in part on performing the LBT procedure in each of the sub-bands). However, this technique is quite restrictive and, as a result, the base station may not be able to transmit the CSI-RS on a majority of occasions.

Another technique for resolving the above issue is to configure the base station to transmit the CSI-RS in valid sub-bands of the wideband (e.g., sub-bands that passed LBT). In such a case, before transmitting the CSI-RS on the valid sub-bands, the base station may transmit a sub-band usage indication. The sub-band usage indication can be transmitted in, for example, COT structure information (COT-SI) that is transmitted before the CSI-RS within the COT. The sub-band usage indication may include information that identifies which sub-bands will carry CSI-RS (i.e., which sub-bands are valid sub-bands) during the COT. Here, the UE may receive the sub-band usage indication before the CSI-RS reception occasion and, therefore, may have knowledge of which sub-bands are valid for CSI-RS reception.

Thus, the UE may receive and process the CSI-RS accordingly. However, UE behavior when implementing this technique has not been defined.

Some aspects described herein provide techniques and apparatuses for CSI-RS processing for NR-U. In some aspects, a UE may select one or more sub-bands, of a plurality of sub-bands in a wideband structure of an unlicensed spectrum, for processing in association with receiving a reference signal, such as a CSI-RS. Here, the one or more sub-bands may include at least one valid sub-band of a set of valid sub-bands in which the reference signal is received. The UE may then process the one or more sub-bands in association with receiving the reference signal. Additional details are provided below with regard to FIGS. 5A and 5B. Notably, while the examples described herein are described in the context of CSI-RS, the techniques and apparatuses described herein can be applied to another type of reference signal, such as a tracking reference signal (TRS).

Figure 5B:
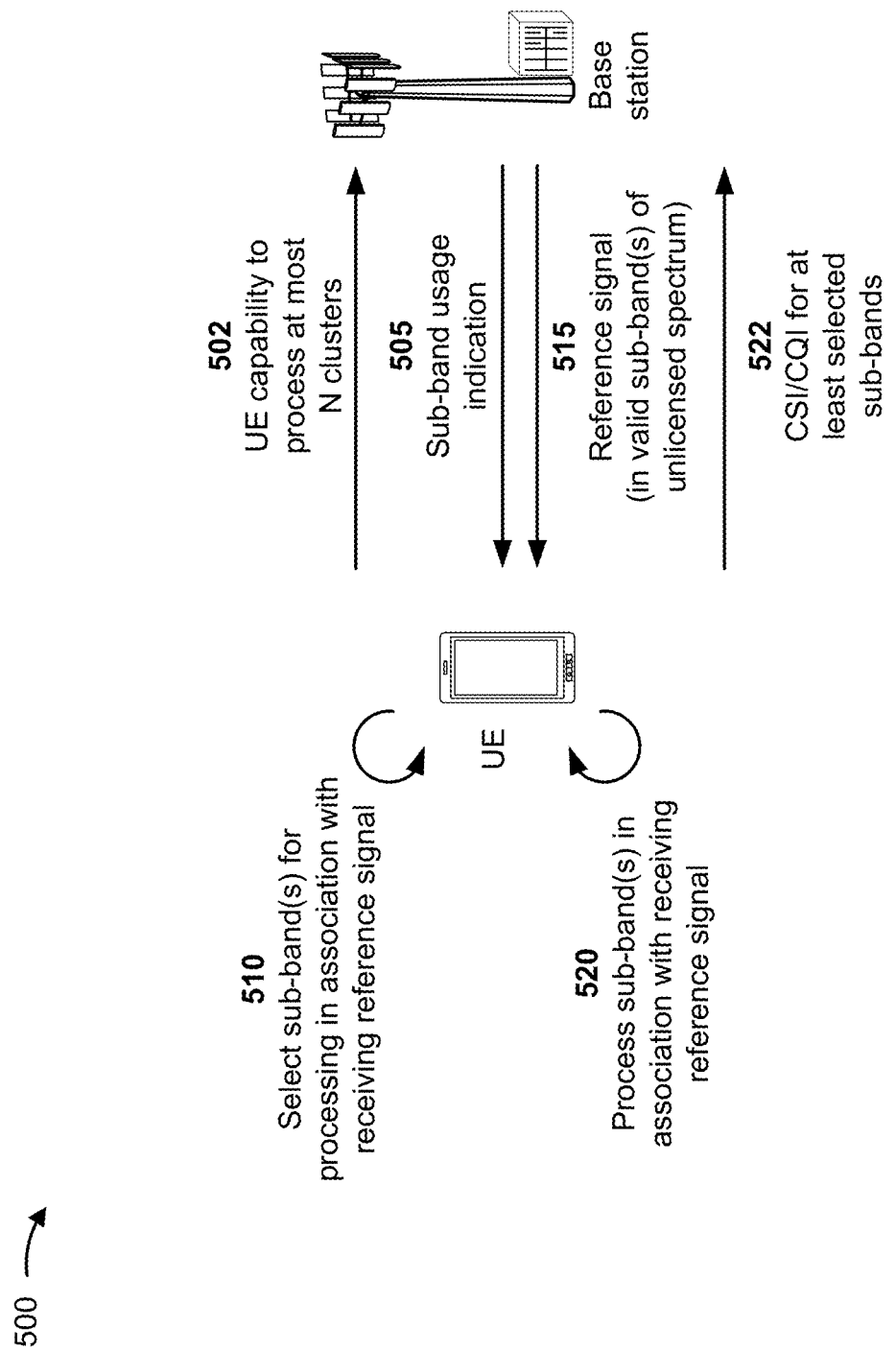

FIGS. 5A and 5B are diagrams associated with an example 500 of CSI-RS processing for NR-U, in accordance with various aspects of the present disclosure.

In some aspects, as described above, a base station (e.g., base station 110) may determine and provide a sub-band usage indication. As described above, the sub-band usage indication may include information that identifies a set of valid sub-bands of a plurality of sub-bands in a wideband structure of an unlicensed spectrum. That is, the sub-band usage indication may include information that identifies one or more sub-bands in the wideband structure of the unlicensed spectrum that will carry a reference signal, such as a CSI-RS (e.g., a periodic CSI-RS (P-CSI-RS), a semi-persistent CSI-RS (SP-CSI-RS)), a TRS, and/or the like.

In some aspects, the set of valid sub-bands may include one or more sub-band clusters, where each sub-band cluster includes one or more contiguous valid sub-bands. For example, as shown in FIG. 5A, if the wideband structure includes sub-bands 0, 1, 2 and 3, and the base station identifies (e.g., using the LBT procedure) sub-bands 0, 2, and 3 as valid (i.e., available during the COT), then the set of valid sub-bands includes two sub-band clusters—a sub-band cluster including sub-band 0 and a sub-band cluster including sub-bands 2 and 3.

In some aspects, the processing capability of a UE may limit the number of sub-band clusters that the UE can process. In some examples, as shown in FIG. 5B by reference number 502, the UE may transmit, to the base station, capability information that includes information that identifies a maximum number of sub-band clusters that the UE can process to base station 110.

In some aspects, as noted above, the base station may determine the sub-band usage indication based at least in part on identifying the set of sub-bands as available or valid during a given COT using an LBT procedure (e.g., based at least in part on acquiring each of the set of sub-bands using the LBT procedure). In some aspects, as indicated in FIG. 5A, the base station may transmit the sub-band usage indication in, for example, COT-SI that is transmitted by the base station within the COT (before the reference signal).

Thus, in some aspects, as shown in FIG. 5B by reference number 505, a UE (e.g., UE 120) may receive, from the base station, a sub-band usage indication including information that identifies a set of valid sub-bands in the wideband structure of the unlicensed spectrum. In some aspects, the UE may receive the sub-band usage indication in the COT-SI transmitted by the base station within the COT (before the reference signal is transmitted on the set of valid sub-bands).

As shown by reference number 510, in some aspects, the UE may select one or more sub-bands, of the plurality of sub-bands in the wideband structure of the unlicensed spectrum, for processing in association with receiving the reference signal. In some aspects, as described in further detail below, the one or more sub-bands selected by the UE may include at least one valid sub-band of the set of valid sub-bands in which the reference signal is received (i.e., the set of valid sub-bands identified by the sub-band usage indication). In some aspects, selection of the one or more sub-bands may be useful because the UE may have a performance limitation for processing a reference signal that is received across multiple non-contiguous sub-band clusters.

In some aspects, the UE may select each of the plurality of sub-bands in the wideband structure for processing. That is, in some aspects, the one or more sub-bands selected by the UE may include each of the plurality of sub-bands in the wideband structure. Such an aspect may be used when, for example, the UE is configured to process all sub-bands of the wideband structure (e.g., such that the UE processes each sub-band independently and, when the reference signal is a CSI-RS, provides a CSI report for each sub-band). Notably, such a configuration of the UE may cause the UE to process one or more invalid sub-bands. Thus, the UE need not receive (and the base station need not transmit) the sub-band usage indication when the UE is configured to select each of the plurality of sub-bands in the wideband structure for processing.

In some aspects, the UE may select the set of valid sub-bands for processing. That is, in some aspects, the one or more sub-bands selected by the UE may include the set of valid sub-bands only. Such an aspect may be used when, for example, the UE is configured to process all valid sub-bands of the wideband structure (e.g., such that the UE processes each valid sub-band independently and, when the reference signal is a CSI-RS, provides a CSI report for each valid sub-band).

In some aspects, the UE may select one or more sub-bands from the set of valid sub-bands, where the one or more sub-bands are chosen from at least one sub-band cluster, of one or more sub-band clusters of the set of valid sub-bands. That is, in some aspects, the one or more sub-bands selected by the UE may include one or more sub-bands included in a subset of valid sub-bands, of the set of valid sub-bands, where the one or more sub-bands are included in at least one sub-band cluster of one or more sub-band clusters.

In some aspects, the at least one sub-band cluster may include a highest priority sub-band cluster of the one or more sub-band clusters. In some aspects, the priority of the sub-band clusters may be based at least in part on frequency (e.g., where lower or higher frequency sub-band clusters have a higher priority) and/or based at least in part on a priority rule configured on the UE. For example, the set of valid sub-bands may include three sub-band clusters. Here, the UE may identify a highest priority sub-band cluster of the three sub-band clusters, and may select the one or more sub-bands as those included in the identified highest priority sub-band cluster. In some aspects, the UE may identify multiple sub-band clusters based at least in part on priority, and may select the one or more sub-bands as those included in the multiple sub-band clusters. Continuing the example described above, the UE may identify a next highest priority sub-band cluster of the three sub-band clusters, and may select the one or more sub-bands as those included in the highest priority sub-band cluster and those included in the next highest priority sub-band cluster. Examples of priority rules are described in further detail below.

In some aspects, the at least one sub-band cluster may include a largest sub-band cluster of the one or more sub-band clusters (e.g., a sub-band cluster with a largest bandwidth, a sub-band cluster with a greatest number of sub-bands, and/or the like). For example, the set of valid sub-bands may include three sub-band clusters. Here, the UE may identify a largest sub-band cluster of the three sub-band clusters, and may select the one or more sub-bands as those included in the identified largest sub-band cluster. In some aspects, the UE may identify multiple sub-band clusters based at least in part on a size of the sub-band clusters, and may select the one or more sub-bands as those included in the multiple sub-band clusters. Continuing the example described above, the UE may identify a next largest sub-band cluster of the three sub-band clusters, and may select the one or more sub-bands as those included in the largest sub-band cluster and those included in the next largest sub-band cluster. In some aspects, when multiple sub-band clusters have a same size, the UE may identify a largest sub-band cluster with a highest priority (e.g., a largest sub-band cluster with a lowest or highest frequency, a largest sub-band cluster with a highest priority according to a priority rule, and/or the like). In some aspects, the priority of a sub-band cluster may be determined by the priority of the sub-bands included in the sub-band cluster (e.g., the priority of a sub-band cluster may be based on the highest priority sub-band in the cluster or the lowest priority sub-band in the cluster).

In some aspects, a number of sub-band clusters identified by the UE may match a number of sub-band clusters that can be processed by the UE. In some aspects, the UE may transmit, to the base station, capability information indicating the number of sub-band clusters that can be processed by the UE, as indicated by 502 in FIG. 5B.

In some aspects, the UE may select the one or more sub-bands based at least in part on a configuration of the UE. That is, in some aspects, the one or more sub-bands may be selected based at least in part on a configuration of the UE (e.g., a default or predefined configuration of the UE).

In some aspects, as described above, the UE may select the one or more sub-bands based at least in part on a priority rule. In some aspects, the priority rule may prioritize a given sub-band, of the plurality of sub-bands, based at least in part on a frequency of the given sub-band. For example, the priority rule may give higher priority to lower frequency sub-bands or sub-band clusters.

In some aspects, the priority rule may prioritize a given sub-band, of the plurality of sub-bands, based at least in part on the given sub-band including a synchronization signal block (SSB) or a physical broadcast channel (PBCH). For example, the priority rule may give a higher priority to a primary sub-band (or a sub-band cluster including the primary sub-band) that includes the SSB or the PBCH.

In some aspects, the priority rule may prioritize a given sub-band, of the plurality of sub-bands, based at least in part on a predefined pattern. For example, the priority rule may identify a priority order (e.g., [sub-band 0, sub-band 1, sub-band 2, sub-band 3]), and the UE may select the one or more sub-bands according to the predefined order. In some aspects, the predefined order may cycle across COTs (e.g., from [sub-band 0, sub-band 1, sub-band 2, sub-band 3]) in a first COT, to [sub-band 1, sub-band 2, sub-band 3, sub-band 0] in a second COT, to [sub-band 2, sub-band 3, sub-band 0, sub-band 1] in a third COT, and so on) in order to dynamically vary sub-band priority across COTs.

In some aspects, the priority rule may prioritize a given sub-band, of the plurality of sub-bands, based at least in part on a time since a most recent channel quality indicator (CQI) report associated with the given sub-band. For example, the priority rule may give higher priority to a sub-band or sub-band cluster for which CQI feedback is most outdated.

In some aspects, the priority rule may prioritize a given sub-band, of the plurality of sub-bands, based at least in part on a priority order indicated by the base station in, for example, the COT-SI (e.g., using an index that corresponds to a predefined priority order configured on the UE).

In some aspects, the priority rule may use any combination of two or more of the above example aspects to select the one or more sub-bands for processing.

In some aspects, the UE may transmit uplink control information (UCI) including an indication of the one or more sub-bands that are selected by the UE (e.g., such that the base station has information that identifies the one or more sub-bands selected by the UE for processing).

As further shown in FIG. 5B by reference number 515, the base station may transmit the reference signal in the set of valid sub-bands, and the UE may receive the reference signal accordingly. For example, with reference to FIG. 5A, the base station may transmit the reference signal in sub-band 0, sub-band 2, and sub-band 3, and the UE may receive the reference signal in at least one of sub-band 0, sub-band 2, and sub-band 3.

Returning to FIG. 5B, as shown by reference number 520, the UE may process the one or more sub-bands (i.e., the one or more sub-bands selected by the UE as described above) in association with receiving the reference signal. In some aspects, as shown by reference 522, the UE may transmit CSI feedback and/or CQI feedback for at least the selected one or more sub-bands.

For example, in some aspects, when processing the one or more sub-bands, the UE may transmit a CSI report for each of the one or more sub-bands. For example, when the reference signal is a CSI-RS, the UE may receive the CSI-RS in the set of valid sub-bands, may generate a CSI report (e.g., including a precoding matrix indicator (PMI), a rank indicator (RI), CQI feedback, and/or the like) for each of the one or more sub-bands, and transmit the CSI report for each of the one or more sub-bands accordingly.

In some aspects, the UE may transmit CQI feedback associated with at least one of the selected sub-bands. In some aspects, the CQI feedback may include sub-band CQI feedback associated with the plurality of sub-bands in the wideband structure. In some aspects, the sub-band CQI feedback may include CQI feedback for each sub-band of the plurality of sub-bands in the wideband structure. Such an aspect can be used when, for example, there is a CSI size mismatch or ambiguity between the UE and the base station (e.g., such that the base station does not have knowledge of the sub-bands for which the UE will provide CQI feedback).

In some aspects, the sub-band CQI feedback may include CQI feedback for each sub-band of the set of valid sub-bands. In some aspects, the sub-band CQI feedback may include CQI feedback for each sub-band included in the one or more sub-bands processed by the UE (e.g., such that the UE transmits CQI feedback only for sub-bands in the sub-bands or sub-band clusters processed by the UE according to a UE capability).

In some aspects, the CQI feedback may include wideband CQI feedback (e.g., a single CQI indication associated with the wideband structure). In some aspects, the UE may transmit the wideband CQI feedback based at least in part on each of the plurality of sub-bands being included in the set of valid sub-bands (i.e., the UE may transmit the wideband CQI feedback when the set of valid sub-bands includes each of the plurality of sub-bands in the wideband structure). In some aspects, when the set of valid sub-bands does not include each of the plurality of sub-bands in the wideband structure, the UE may include an invalid indication in the wideband CQI feedback. In some aspects, the UE may determine the wideband CQI feedback based at least in part on previous CQI feedback for at least one sub-band, of the plurality of sub-bands, that is not included in the set of valid sub-bands. That is, in some aspects, the UE may use previous CQI feedback, associated with the at least one sub-band not valid in the COT, in association with computing the wideband CQI feedback. In some aspects, the UE may determine the wideband CQI feedback based at least in part on one or more sub-bands of the set of valid sub-bands only. That is, in some aspects, the UE may determine the wideband CQI feedback based on only a subset of the valid sub-bands (e.g., due to, for example, a UE capability limitation). In some aspects, the UE may transmit uplink control information including an indication of the one or more sub-bands based at least in part on which the wideband CQI feedback is determined.

In some aspects, when processing the one or more sub-bands, the UE may perform channel estimation associated with the wideband structure. For example, in some aspects, the UE may perform the channel estimation based at least in part on a wideband channel estimator. Here, the UE may use the wideband channel estimator even though some sub-bands of the wideband structure may not be included in the set of valid sub-bands. In such a case, the base station may resolve any issues (e.g., CQI feedback issues caused by an impact of the invalid sub-bands on the wideband channel estimate). As another example, in some aspects, the UE may perform the channel estimation based at least in part on the set of valid sub-bands, or based at least in part on a set of sub-bands used for reporting CQI feedback, as described below.

In some aspects, a manner in which the UE performs the channel estimation is based at least in part on whether the set of valid sub-bands are contiguous or non-contiguous within the wideband structure. For example, assume that the wideband includes sub-bands 0 through 3. Here, if sub-band 0, sub-band 2, and sub-band 3 are included in the set of valid sub-bands (i.e., sub-band 1 is not included in the set of valid sub-bands such that the set of valid sub-bands includes two non-contiguous clusters), then the UE may perform channel estimation using a wideband channel estimator (e.g., since gain may be improved despite the "hole" at sub-band 1). However, if only sub-band 2 and sub-band 3 are included in the set of valid sub-bands (i.e., sub-band 0 and sub-band 1 are not included in the set of valid sub-bands such that the set of valid sub-bands includes one contiguous clusters), then the UE may perform channel estimation based at least in part on the set of valid sub-bands, or based at least in part on a set of sub-bands used for reporting CQI feedback (e.g., sub-band 2 and/or sub-band 3).

As indicated above, FIGS. 5A and 5B are provided as examples. Other examples may differ from what is described with respect to FIGS. 5A and 5B.

FIG. 6 is a diagram illustrating an example process 600 performed, for example, by a UE, in accordance with various aspects of the present disclosure. Example process 600 is an example where the UE (e.g., UE 120 and/or the like) performs operations associated with CSI-RS processing for NR-U.

As shown in FIG. 6, in some aspects, process 600 may include selecting one or more sub-bands, of a plurality of sub-bands in a wideband structure of an unlicensed spectrum, for processing in association with receiving a reference signal, wherein the one or more sub-bands include at least one valid sub-band of a set of valid sub-bands in which the reference signal is received (block 610). For example, the UE (e.g., using receive processor 258, controller/processor 280, memory 282, and/or the like) may select one or more sub-bands, of a plurality of sub-bands in a wideband structure of an unlicensed spectrum, for processing in association with receiving a reference signal, as described above. In some aspects, the one or more sub-bands include at least one valid sub-band of a set of valid sub-bands in which the reference signal is received.

As further shown in FIG. 6, in some aspects, process 600 may include processing the one or more sub-bands in association with receiving the reference signal (block 620). For example, the UE (e.g., using receive processor 258, controller/processor 280, memory 282, and/or the like) may process the one or more sub-bands in association with receiving the reference signal, as described above.

As further shown in FIG. 6, in some aspects, process 600 may include transmitting CSI feedback or CQI feedback for at least the selected one or more sub-bands (block 620). For example, the UE (e.g., using transmit processor 264, controller/processor 280, memory 282, and/or the like) may transmit CSI feedback and/or CQI feedback for at least the selected one or more sub-bands, as described above.

Process 600 may include additional aspects, such as any single aspect or any combination of aspects described below and/or in connection with one or more other processes described elsewhere herein.

In a first aspect, the reference signal is a CSI-RS.

In a second aspect, alone or in combination with the first aspect, the set of valid sub-bands is determined based at least in part on a sub-band usage indication.

In a third aspect, alone or in combination with one or more of the first and second aspects, the sub-band usage indication is received in COT-SI.

In a fourth aspect, alone or in combination with one or more of the first through third aspects, processing the one or more sub-bands include transmitting a CSI report for each of the one or more sub-bands.

In a fifth aspect, alone or in combination with one or more of the first through fourth aspects, the set of valid sub-bands comprises one or more sub-bands identified as available based at least in part on an LBT procedure.

In a sixth aspect, alone or in combination with one or more of the first through fifth aspects, the one or more sub-bands include each of the plurality of sub-bands in the wideband structure.

In a seventh aspect, alone or in combination with one or more of the first through sixth aspects, the one or more sub-bands include the set of valid sub-bands only.

In an eighth aspect, alone or in combination with one or more of the first through seventh aspects, the one or more sub-bands include a subset of valid sub-bands, of the set of valid sub-bands, included in at least one sub-band cluster of one or more sub-band clusters.

In a ninth aspect, alone or in combination with one or more of the first through eighth aspects, the at least one sub-band cluster includes a highest priority sub-band cluster, of the one or more sub-band clusters, according to a priority rule.

In a tenth aspect, alone or in combination with one or more of the first through ninth aspects, the at least one sub-band cluster includes a largest sub-band cluster of the one or more sub-band clusters.

In an eleventh aspect, alone or in combination with one or more of the first through tenth aspects, process 600 includes transmitting capability information indicating a number of sub-band clusters that can be processed by the UE, wherein a number of sub-band clusters in the at least one sub-band cluster is matching the number of sub-band clusters that can be processed by the UE.

In a twelfth aspect, alone or in combination with one or more of the first through eleventh aspects, the one or more sub-bands are selected based at least in part on a configuration of the UE.

In a thirteenth aspect, alone or in combination with one or more of the first through twelfth aspects, process 600 includes transmitting uplink control information including an indication of the one or more sub-bands.

In a fourteenth aspect, alone or in combination with one or more of the first through thirteenth aspects, the one or more sub-bands are selected based at least in part on a priority rule.

In a fifteenth aspect, alone or in combination with one or more of the first through fourteenth aspects, the priority rule prioritizes a given sub-band, of the plurality of sub-bands, based at least in part on a frequency of the given sub-band.

In a sixteenth aspect, alone or in combination with one or more of the first through fifteenth aspects, the priority rule prioritizes a given sub-band, of the plurality of sub-bands, based at least in part on the given sub-band including a SSB or a PBCH.

In a seventeenth aspect, alone or in combination with one or more of the first through sixteenth aspects, the priority rule prioritizes a given sub-band, of the plurality of sub-bands, based at least in part on a predefined pattern.

In an eighteenth aspect, alone or in combination with one or more of the first through seventeenth aspects, the priority rule prioritizes a given sub-band, of the plurality of sub-bands, based at least in part on a time since a most recent CQI report associated with the given sub-band.

In a nineteenth aspect, alone or in combination with one or more of the first through eighteenth aspects, the priority rule prioritizes a given sub-band, of the plurality of sub-bands, based at least in part on a priority order indicated in COT-SI.

In a twentieth aspect, alone or in combination with one or more of the first through nineteenth aspects, process 600 includes transmitting sub-band CQI feedback associated with the plurality of sub-bands in the wideband structure.

In a twenty-first aspect, alone or in combination with one or more of the first through twentieth aspects, the sub-band CQI feedback includes CQI feedback for each sub-band of the plurality of sub-bands in the wideband structure.

In a twenty-second aspect, alone or in combination with one or more of the first through twenty-first aspects, the sub-band CQI feedback includes CQI feedback for each sub-band of the set of valid sub-bands.

In a twenty-third aspect, alone or in combination with one or more of the first through twenty-second aspects, the sub-band CQI feedback includes CQI feedback for each sub-band included in the one or more sub-bands processed by the UE.

In a twenty-fourth aspect, alone or in combination with one or more of the first through twenty-third aspects, process 600 includes transmitting wideband CQI feedback associated with the wideband structure.

In a twenty-fifth aspect, alone or in combination with one or more of the first through twenty-fourth aspects, the wideband CQI feedback is transmitted based at least in part on each of the plurality of sub-bands being included in the set of valid sub-bands.

In a twenty-sixth aspect, alone or in combination with one or more of the first through twenty-fifth aspects, an invalid indication is included in the wideband CQI feedback if at least one of the plurality of sub-bands is not included in the set of valid sub-bands.

In a twenty-seventh aspect, alone or in combination with one or more of the first through twenty-sixth aspects, the wideband CQI feedback is determined based at least in part on previous CQI feedback for at least one sub-band, of the plurality of sub-bands, that is not included in the set of valid sub-bands.

In a twenty-eighth aspect, alone or in combination with one or more of the first through twenty-seventh aspects, the wideband CQI feedback is determined based at least in part on one or more sub-bands of the set of valid sub-bands only.

In a twenty-ninth aspect, alone or in combination with one or more of the first through twenty-eighth aspects, process 600 includes transmitting uplink control information including an indication of the one or more sub-bands based at least in part on which the wideband CQI feedback is determined.

In a thirtieth aspect, alone or in combination with one or more of the first through twenty-ninth aspects, the reference signal is a TRS.

In a thirty-first aspect, alone or in combination with one or more of the first through thirtieth aspects, processing the one or more sub-bands includes performing channel estimation associated with the wideband structure.

In a thirty-second aspect, alone or in combination with one or more of the first through thirty-first aspects, the channel estimation is performed based at least in part on a wideband channel estimator.

In a thirty-third aspect, alone or in combination with one or more of the first through thirty-second aspects, the channel estimation is performed based at least in part on: the set of valid sub-bands; or a set of sub-bands used for reporting CQI feedback.

In a thirty-fourth aspect, alone or in combination with one or more of the first through thirty-third aspects, a manner in which the channel estimation is performed is based at least in part on whether the set of valid sub-bands are contiguous or non-contiguous within the wideband structure.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication of a set of valid sub-bands, of a plurality of sub-bands in a wideband structure, associated with receiving a reference signal;
   receiving the reference signal in one or more sub-bands of the plurality of sub-bands,
      wherein the one or more sub-bands include at least one valid sub-band of the set of valid sub-bands, and
      wherein the one or more sub-bands are selected based at least in part on a priority rule, and wherein the priority rule indicates that a given sub-band, of the plurality of sub-bands, is selected over another sub-band, of the plurality of sub-bands, based at least in part on the given sub-band including a synchronization signal block (SSB) or a physical broadcast channel (PBCH) and the other sub-band not including the SSB or the PBCH; and
   transmitting information associated with processing the one or more sub-bands in association with receiving the reference signal.

2. The method of claim 1, wherein the reference signal is a channel state information reference signal (CSI-RS).

3. The method of claim 1, wherein transmitting the information associated with processing the one or more sub-bands in association with receiving the reference signal comprises:
   transmitting a channel state information (CSI) report for each of the one or more sub-bands.

4. The method of claim 1, wherein the one or more sub-bands include each of the plurality of sub-bands in the wideband structure.

5. The method of claim 1, wherein the one or more sub-bands include the set of valid sub-bands only.

6. The method of claim 1, wherein the one or more sub-bands include a subset of valid sub-bands, of the set of valid sub-bands, included in at least one sub-band cluster of one or more sub-band clusters.

7. The method of claim 6, wherein the at least one sub-band cluster includes a largest sub-band cluster of the one or more sub-band clusters.

8. The method of claim 6, further comprising:
   transmitting capability information indicating a number of sub-band clusters that can be processed by the UE, wherein a number of sub-band clusters in the at least one sub-band cluster matches the number of sub-band clusters that can be processed by the UE.

9. The method of claim 1, wherein the one or more sub-bands are selected based at least in part on a configuration of the UE.

10. The method of claim 1, wherein the priority rule prioritizes a sub-band, of the plurality of sub-bands, based at least in part on a frequency of the sub-band.

11. The method of claim 1, further comprising:
    transmitting sub-band channel quality indicator (CQI) feedback associated with the plurality of sub-bands in the wideband structure.

12. The method of claim 11, wherein the sub-band CQI feedback includes CQI feedback for each sub-band of the plurality of sub-bands in the wideband structure or for each valid sub-band of the set of valid sub-bands.

13. The method of claim 1, further comprising:
    transmitting wideband channel quality indicator (CQI) feedback associated with the wideband structure.

14. The method of claim 13, wherein the wideband CQI feedback is transmitted based at least in part on each of the plurality of sub-bands being included in the set of valid sub-bands.

15. The method of claim 13, wherein an invalid indication is included in the wideband CQI feedback if at least one of the plurality of sub-bands is not included in the set of valid sub-bands.

16. The method of claim 13, wherein the wideband CQI feedback is determined based at least in part on one or more valid sub-bands of the set of valid sub-bands only.

17. The method of claim 13, further comprising:
    transmitting uplink control information including an indication of the one or more sub-bands based at least in part on which the wideband CQI feedback is determined.

18. The method of claim 1, further comprising:
    performing channel estimation associated with the wideband structure, the channel estimation being performed based at least in part on at least one of:
    a wideband channel estimator,
    the set of valid sub-bands, or
    a set of sub-bands used for reporting channel quality indicator (CQI) feedback.

19. A user equipment (UE) for wireless communication, comprising:

one or more memories; and one or more processors coupled to the one or more memories, the one or more processors individually or collectively configured to:

receive an indication of a set of valid sub-bands, of a plurality of sub-bands in a wideband structure, associated with receiving a reference signal;

receive the reference signal in one or more sub-bands of the plurality of sub-bands, wherein the one or more sub-bands include at least one valid sub-band of the set of valid sub-bands, and wherein the one or more sub-bands are selected based at least in part on a priority rule, and wherein the priority rule indicates that a given sub-band, of the plurality of sub-bands, is selected over another sub-band, of the plurality of sub-bands, based at least in part on the given sub-band including a synchronization signal block (SSB) or a physical broadcast channel (PBCH) and the other sub-band not including the SSB or the PBCH; and transmit information associated with processing the one or more sub-bands in association with receiving the reference signal.

20. The UE of claim 19, wherein the reference signal is a channel state information reference signal (CSI-RS).

21. The UE of claim 19, wherein the one or more processors, to transmit the information associated with processing the one or more sub-bands in association with receiving the reference signal, are configured to:

transmit a channel state information (CSI) report for each of the one or more sub-bands.

22. The UE of claim 19, wherein the one or more sub-bands include each of the plurality of sub-bands in the wideband structure.

23. The UE of claim 19, wherein the one or more sub-bands include the set of valid sub-bands only.

24. The UE of claim 19, wherein the one or more sub-bands include a subset of valid sub-bands, of the set of valid sub-bands, included in at least one sub-band cluster of one or more sub-band clusters.

25. The UE of claim 19, wherein the one or more sub-bands are selected further based at least in part on at least one of a configuration of the UE.

26. The UE of claim 19, wherein the one or more sub-bands are selected further based at least in part on a priority associated with the one or more sub-bands.

27. The UE of claim 19, wherein the one or more processors are further configured to:

transmit wideband channel quality indicator (CQI) feedback associated with the wideband structure.

28. The UE of claim 27, wherein the wideband CQI feedback is transmitted based at least in part on each of the plurality of sub-bands being included in the set of valid sub-bands.

29. A non-transitory computer-readable medium storing one or more instructions for wireless communication, the one or more instructions comprising:

one or more instructions that, when executed by one or more processors of a user equipment (UE), cause the one or more processors to:

receive an indication of a set of valid sub-bands, of a plurality of sub-bands in a wideband structure, associated with receiving a reference signal;

receive the reference signal in one or more sub-bands of the plurality of sub-bands, wherein the one or more sub-bands include at least one valid sub-band of the set of valid sub-bands, and wherein the one or more sub-bands are selected based at least in part on a priority rule, and wherein the priority rule indicates that a given sub-band, of the plurality of sub-bands, is selected over another sub-band, of the plurality of sub-bands, based at least in part on the given sub-band including a synchronization signal block (SSB) or a physical broadcast channel (PBCH) and the other sub-band not including the SSB or the PBCH; and transmit information associated with processing the one or more sub-bands in association with receiving the reference signal.

30. An apparatus comprising:

means for receiving an indication of a set of valid sub-bands, of a plurality of sub-bands in a wideband structure, associated with receiving a reference signal;

means for receiving the reference signal in one or more sub-bands of the plurality of sub-bands, wherein the one or more sub-bands include at least one valid sub-band of the set of valid sub-bands, and wherein the one or more sub-bands are selected based at least in part on a priority rule, and wherein the priority rule indicates that a given sub-band, of the plurality of sub-bands, is selected over another sub-band, of the plurality of sub-bands, based at least in part on the given sub-band including a synchronization signal block (SSB) or a physical broadcast channel (PBCH) and the other sub-band not including the SSB or the PBCH; and means for transmitting information associated with processing the one or more sub-bands in association with receiving the reference signal.

* * * * *